(12) United States Patent
Daines-Martinez et al.

(10) Patent No.: US 8,202,426 B2
(45) Date of Patent: *Jun. 19, 2012

(54) MEMBRANE STATION WASTE TREATMENT PROCESS

(75) Inventors: Catherine Daines-Martinez, Andresy (FR); Jean-Christophe Schrotter, Maisons-Laffitte (FR); Karine Drouet, Acheres (FR); Abdelkader Gaid, Paris (FR)

(73) Assignee: Veolia Water Solutions & Technologies Support, Saint-Maurice Cedex (FR)

( * ) Notice: Subject to any disclaimer, the term of this patent is extended or adjusted under 35 U.S.C. 154(b) by 458 days.

This patent is subject to a terminal disclaimer.

(21) Appl. No.: 12/513,583

(22) PCT Filed: Oct. 31, 2007

(86) PCT No.: PCT/EP2007/061729
§ 371 (c)(1),
(2), (4) Date: Jul. 20, 2009

(87) PCT Pub. No.: WO2008/055827
PCT Pub. Date: May 15, 2008

(65) Prior Publication Data
US 2010/0065497 A1    Mar. 18, 2010

(30) Foreign Application Priority Data
Nov. 6, 2006    (FR) ...................... 06 09676

(51) Int. Cl.
*B01D 61/16*    (2006.01)
*C02F 1/52*    (2006.01)

(52) U.S. Cl. ............ 210/638; 71/48; 210/639; 210/651; 210/699; 210/710; 210/712; 210/713; 210/723; 210/738; 210/804; 210/906

(58) Field of Classification Search .................. 210/638, 210/639, 650, 651, 699, 702, 705, 710, 713, 210/723–727, 738, 804, 805, 806, 906, 712, 210/714, 716, 722; 71/33, 48
See application file for complete search history.

(56) References Cited

U.S. PATENT DOCUMENTS 5,093,007 A * 3/1992 Domvile ....................... 210/713
(Continued)

FOREIGN PATENT DOCUMENTS

DE    4338569    5/1994
(Continued)

OTHER PUBLICATIONS

Ericsson, B. and Magnus Hallberg and Jan Wachenfeldt, Nanofiltration of Highly Colored Raw Water for Drinking Water Production, Desalination, 1996, pp. 129-141, 108, Elsevier Science B.V.
(Continued)

*Primary Examiner* — Joseph Drodge
(74) *Attorney, Agent, or Firm* — Coats & Bennett, P.L.L.C.

(57) ABSTRACT

A method of removing phosphonates from water includes directing the water into a first settling zone. The water is then directed to a membrane filtration zone and is filtered therein to produce a concentrate containing phosphonates. The concentrate containing phosphonates is then contacted with sludge such that at least some of the phosphonates in the concentrate are adsorbed onto the sludge. Flocculant is added to the sludge and the concentrate to form a floc-mixture which is directed to a second settling zone to form treated concentrate.

21 Claims, 2 Drawing Sheets

U.S. PATENT DOCUMENTS

| | | | | |
|---|---|---|---|---|
| 6,071,417 A * | 6/2000 | Adachi | | 210/723 |
| 6,113,797 A * | 9/2000 | Al-Samadi | | 210/652 |
| 6,383,398 B2 * | 5/2002 | Amer | | 210/710 |
| 6,426,005 B1 * | 7/2002 | Larsson | | 210/650 |
| 6,428,705 B1 * | 8/2002 | Allen et al. | | 210/638 |
| 6,777,469 B2 * | 8/2004 | Blount | | 524/198 |
| 6,872,312 B1 * | 3/2005 | Shah et al. | | 210/609 |
| 7,438,817 B2 * | 10/2008 | Nagghappan et al. | | 210/639 |
| 7,491,333 B1 * | 2/2009 | Luke et al. | | 210/638 |
| 2011/0024360 A1 * | 2/2011 | Kelley et al. | | 210/724 |

FOREIGN PATENT DOCUMENTS

| | | |
|---|---|---|
| WO | 0234680 | 5/2002 |
| WO | 2004/083132 | 9/2004 |

OTHER PUBLICATIONS

Nederlof, M.M. and J.A.M. van Paassen and R. Jong, Nanofiltration Concentrate Disposal: Experiences in the Netherlands, Desalination, 2005, pp. 303-312, 178, Elsevier Science B.V.

* cited by examiner

MEMBRANE STATION WASTE TREATMENT PROCESS

This application is a U.S. National Stage Application of PCT Application No. PCT/EP2007/061729, with an international filing date of 31 Oct. 2007. Applicant claims priority based on French Patent Application No. 06/09676 filed 6 Nov. 2006. The subject matter of these applications is incorporated herein.

The field of the invention is that of water treatment. More specifically, the invention relates to water treatment processes comprising at least one membrane filtration step.

The invention particularly, but not exclusively, applies to treatments of water intended to undergo a reverse osmosis or nanofiltration membrane treatment.

The invention preferentially applies to water potabilisation processes.

Water for human consumption is conventionally subjected to a nanofiltration or reverse osmosis membrane filtration treatment to reduce the content thereof of pesticides and other micro-pollutants which may be removed by means of membrane processes.

Nanofiltration also makes it possible to remove bivalent anions, such as sulphates, and also reduce the content of other salts, such as nitrates for example.

Reverse osmosis uses membranes similar to those for nanofiltration but with a higher separation power. It makes it possible to remove practically all the organic and mineral pollutants from water. Reverse osmosis is particularly used for the production of water for human consumption.

In addition, it is conventional to have the water undergo a pre-treatment upstream from the reverse osmosis and nanofiltration membrane treatments, said pre-treatment consisting of a low-speed liquid-solid separation (for example, simple or lamellar settling and/or two-layer direct filtration, and/or floatation).

A coagulation-flocculation treatment is also frequently performed.

One drawback of membrane filtration techniques is the production of waste referred to as concentrates representing 10 to 60% of the initial flow rate, and which are in the majority of cases, charged with phosphonates.

These phosphonates are obtained from sequestering agents injected upstream from the membranes. They are intended to prevent the precipitation of salts on the membranes. They are completely stopped by same, thus being concentrated approximately 2 to 7 times in the membrane waste.

However, authorities tend to prohibit phosphonate waste in rivers. This problem particularly occurs for waste from drinking water production plants, which is liable to partly reach river waters.

Therefore, it is necessary to propose a technique to prevent such waste.

This is an aim of the invention.

More specifically, the aim of the invention is to propose a technique for the elimination of undesirable species in waste such as phosphonates, applied to a water treatment comprising a pre-treatment and membrane filtration step.

The aim of the invention is also to propose such a technique which makes it possible to reduce the operating costs compared to processes according to the prior art.

The aim of the invention is also to provide such a technique which offers optimised recycling processes for pre-treatment sludge, particularly that produced by the settling steps.

A further aim of the invention is to provide such a technique which is simple in design and easy to implement.

The invention also makes it possible to treat the waste in order to recycle same using it for cleaning industrial constructions such as for example the sand filter.

These aims, along with others which will emerge hereinafter, are achieved by means of the invention which relates to a water treatment process, comprising a first pre-treatment step producing pre-treated water and sludge, said pre-treated water undergoing at least one filtration step including at least one on a membrane, said filtration step producing waste, characterised in that said waste from said membrane filtration step undergoes a treatment phase including at least one coagulation-flocculation step followed by a second settling step producing sludge, said coagulation-flocculation step being preceded by at least one adsorption step on said sludge from the pre-treatment or the settling step, said adsorption step being intended to lower the phosphonates contained in said water from said membrane filtration step.

As mentioned above, the phosphonates are obtained from sequestering agents injected upstream from the membranes, concentrated approximately 2 to 7 times thereon.

However, the sequestering agents being chelating agents, they are easily adsorbed on clays, calcites or metal hydroxides, the latter compounds being conventionally found in settling sludge. Said hydroxides are obtained from iron or aluminium-based coagulants used during the coagulation step.

Therefore, the adsorption capacity of the sludge is used to eliminate phosphonates from the membrane filtration concentrates.

In addition, the process according to the invention enables a reduction in the coagulant dosages, and therefore a reduction in the corresponding operating costs.

Indeed, in the case of conventional concentrate coagulation-flocculation, the coagulant dosages are two to three times higher than in the case of the process according to the invention. This is explained by the fact that part of the phosphonates is pre-adsorbed on drinking water plant waste treatment station sludge. Therefore, the residue to be eliminated involves a lower coagulant consumption.

It is noted that the use of sludge for the adsorption step does not generate high additional costs, said sludge being a by-product of the process according to the invention. Therefore, recycling this sludge is relatively inexpensive.

It is also noted that enriching the sludge with phosphorus is beneficial for the agricultural recycling thereof, the concentration of the sludge with phosphorus enabling superior fertilisation of soils in manure. In addition, phosphorus in phosphonate form is less accessible than phosphorus in phosphate form. The breakdown thereof to phosphorus will therefore be slower, and thus more beneficial for the soil.

Preferentially, said sludge consists of iron and/or aluminium hydroxide sludge.

According to a preferred embodiment, said adsorption step is performed under stirring for approximately 10 minutes.

According to another feature, said coagulation-flocculation step is performed at least in two successive phases, the first under fast stirring and the second under slow stirring.

Advantageously, said settling step(s) is/are performed for approximately 15 minutes.

According to another feature, the process comprises a recycling step of said sludge in agricultural manure.

In this case, the process comprises at least one concentration step of said sludge when said sludge is saturated with phosphorus.

In this way, the phosphorus concentration of the sludge is increased further, which improves the capacity to fertilise soils in manure.

Other features and advantages of the invention will emerge more clearly on reading the following description of a preferential embodiment of the invention, given as an illustrative and non-limitative example, and the appended figures wherein.

As specified above, the principle of the invention lies in the provision, in a water treatment including a pre-treatment step and at least one membrane filtration step, an elimination step of the phosphonates found in the concentrates by means of physicochemical adsorption on sludge from a drinking water waste treatment.

Figure 1:
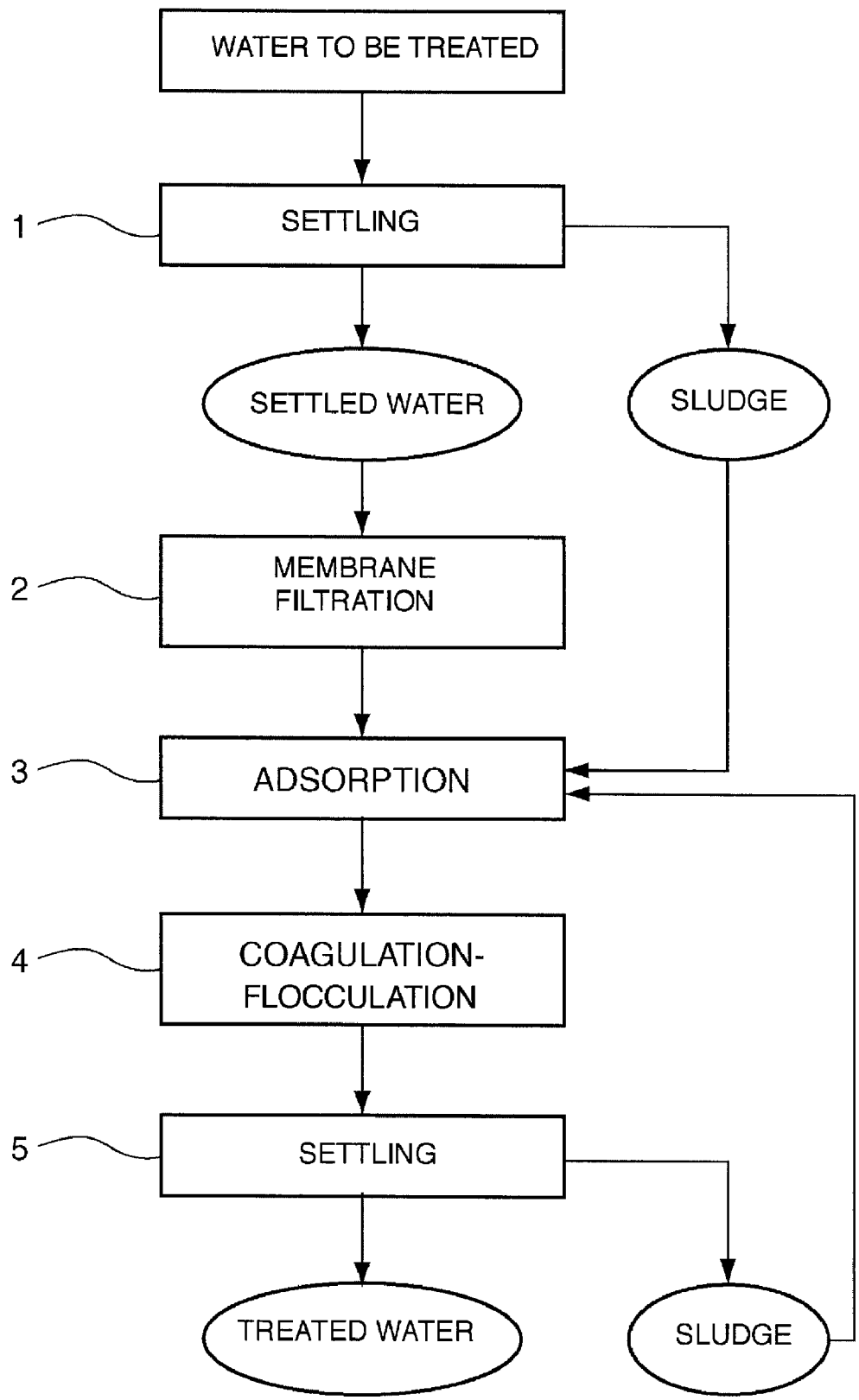
FIG. 1 is a synoptic representation of a water treatment process according to the invention.

An example of a process according to the invention is illustrated by FIG. 1.

As illustrated, the water to be treated undergoes a primary settling step 1, following which settled water and settling sludge are obtained.

The settled water undergoes a membrane filtration step 2, by means of nanofiltration or reverse osmosis.

The membrane treatment concentrates then undergo a treatment phase including a coagulation/flocculation step 4 and a secondary settling step 5, following which treated water and settling sludge are obtained.

According to the principle of the invention, a phosphonate adsorption step 3 is inserted between the membrane filtration step 2 and the coagulation/flocculation step 4.

Said adsorption step is performed for 10 minutes, under stirring, with a stirring speed of 60 rpm, on sludge from the primary settling step 1 and/or on the secondary settling step 5.

The adsorbent material is preferentially iron or aluminium hydroxide sludge. The sludge concentration will vary between 125 and 400 mg/l (expressed as SS) according to site availabilities.

The coagulation/flocculation step 4 is broken down into two phases: a first phase under fast stirring at 250 rpm followed by a second phase under slow stirring at 60 rpm.

The coagulant is of the mineral type, preferentially $FeCL_3$, wherein the concentration will vary between 50 and 100 mg/l.

The flocculent is of the 4190 SH Floerger type (registered trademark), having a concentration between 0.5 and 1 ppm.

The duration of the settling steps 1, 5 is 15 minutes.

Tests were conducted to demonstrate the contribution of a process according to the invention to the quantity of coagulant with respect to a process with an adsorption step.

To perform said tests, concentrates from a membrane installation were mixed with sludge from a drinking water plant water treatment. This sludge is rich in $FeCl_3$ used as a coagulant on the treatment station.

The tests were conducted according to the protocol detailed above.

For superior reliability of the analyses, the elimination of the phosphonates is determined according to the reduction of $P_{total}$.

The membrane concentrates were mixed during the adsorption step at different sludge doses expressed in mg/l of suspended solids (SS).

In a second phase, a coagulation step is performed at different $FeCl_3$ doses.

Figure 2:
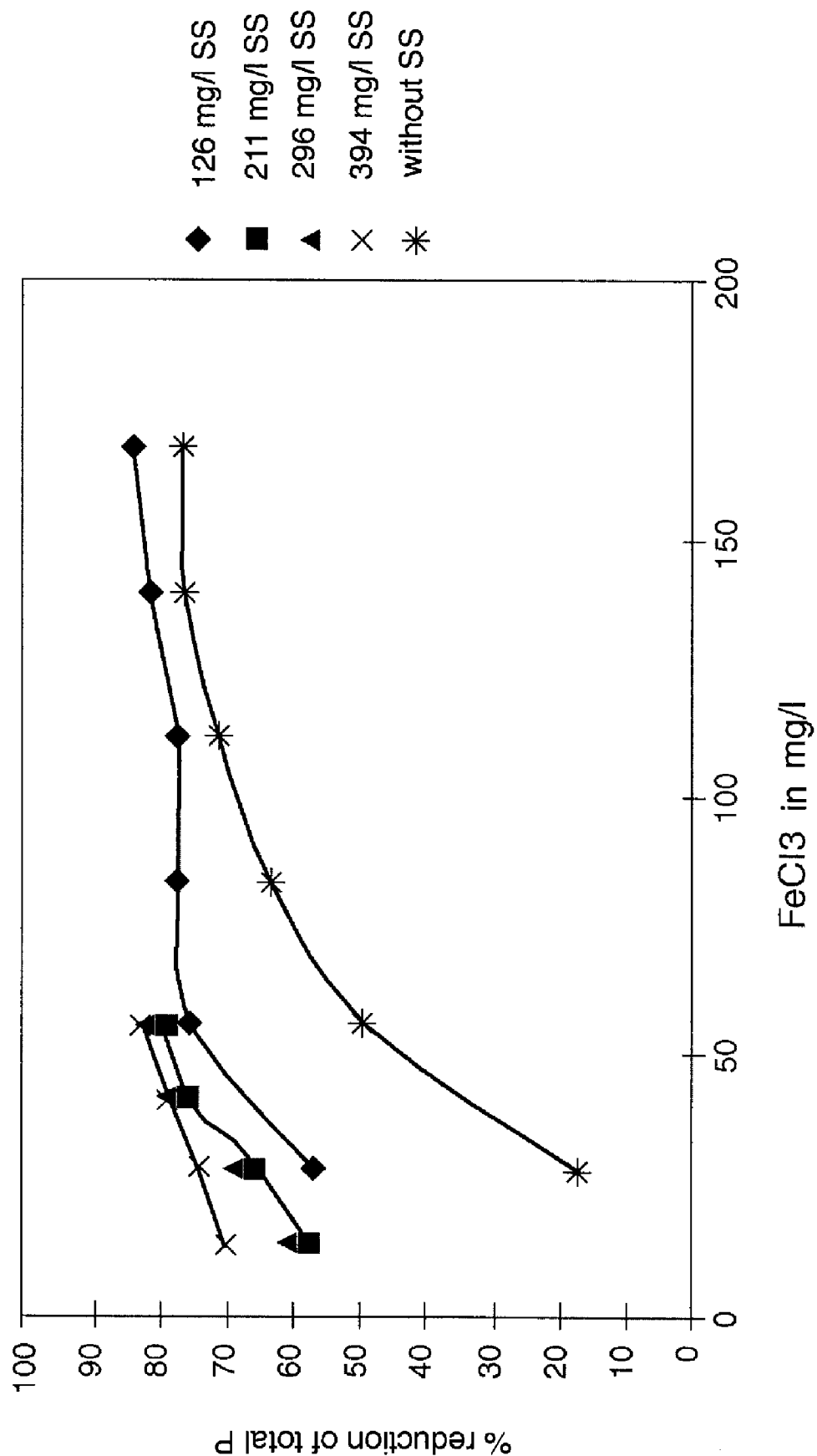
FIG. 2 is a phosphorus reduction graph at different sludge doses.

The results of these tests are listed in the graph in FIG. 2.

It is observed that, for the same $P_{total}$ reduction percentage, the $FeCl_3$ doses used are much lower when an adsorption step is performed with sludge at 125 mg/l.

In one embodiment, 75% of the $P_{total}$ was eliminated, by using 60 ppm of $FeCl_3$ (commercial product) with 126 ppm (SS) sludge for 150 ppm of $FeCl_3$ without an adsorption step.

The invention claimed is:

1. A method of removing phosphonates from water comprising:
   directing the water into a first settling zone and producing a first portion of sludge in the first settling zone;
   directing the water from the first settling zone to a membrane filtration zone and filtering the water in the membrane filtration zone to produce a concentrate containing phosphonates;
   contacting the concentrate containing phosphonates with the first portion of sludge such that at least some of the phosphonates in the concentrate are adsorbed onto the first portion of sludge;
   adding a flocculant to the sludge and the concentrate to form a floc-mixture; and
   directing the floc-mixture to a second settling zone to form treated concentrate.

2. The method of claim 1 further comprising producing a second portion of sludge in the second settling zone; and wherein the concentrate is contacted with the second portion of sludge such that at least some of the phosphonates in the concentrate are adsorbed onto the second portion of sludge.

3. The method of claim 1 further comprising producing a second portion of sludge in the second settling zone; and wherein the concentrate is contacted with the first and second portions of sludge such that at least some of the phosphonates in the concentrate are adsorbed onto the first and second portions of sludge.

4. The method of claim 1 wherein the sludge contains iron hydroxide or aluminum hydroxide and the phosphonates are adsorbed onto the iron or aluminum hydroxide in the sludge.

5. The method of claim 1 further comprising adding a coagulant to the flocculant and concentrate to form the floc-mixture.

6. The method of claim 5 wherein the coagulant comprises iron or aluminum and the sludge contains hydroxide and the method further comprises:
   forming iron hydroxide or aluminum hydroxide in the sludge by adding the coagulant to the sludge; and
   wherein at least some of the phosphonates are adsorbed onto the iron hydroxide or aluminum hydroxide in the sludge.

7. The method of claim 5 wherein the coagulant includes $FeCl_3$ and has a concentration between 50 and 100 mg/l.

8. The method of claim 1 further comprising mixing the concentrate with the first portion of sludge for approximately 10 minutes.

9. The method of claim 1 further comprising concentrating the sludge having adsorbed phosphonates.

10. The method of claim 1 further comprising recycling the sludge having adsorbed phosphonates for agricultural manure.

11. The method of claim 1 further comprising adding the phosphonates to the water upstream from the membrane filtration zone to prevent precipitation of salts on membranes in the membrane filtration zone.

12. The method of claim 1 further comprising:
   adding phosphonates to the water upstream from the membrane filtration zone;
   adding a coagulant to the water;
   forming a second portion of sludge in the second settling zone; and contacting the first and second portions of sludge with the concentrate such that phosphonates are adsorbed onto the first and second portions of sludge.

13. The method of claim 1 further comprising:
adding phosphonates to the water upstream from the membrane filtration zone;
adding a coagulant comprising iron or aluminum to the water;
mixing the flocculant with the sludge and concentrate at a relatively fast speed and then at a subsequent relatively slow speed;
forming a second portion of sludge in the second settling zone;
contacting the first and second portions of sludge with the concentrate such that phosphonates are adsorbed onto the first and second portions of sludge; and
recycling the first portion of sludge or the second portion of sludge having adsorbed phosphonates for agricultural manure.

14. A method of removing phosphonates from water, comprising:
directing the water having phosphonates to a first settling zone and producing a first sludge and clarified water;
directing the clarified water to a membrane filtration zone and filtering the clarified water in the membrane filtration zone and producing a concentrate having phosphonates;
mixing the concentrate with the first sludge and a second sludge produced from a source other than the first settling zone to form a concentrate-sludge mixture;
adsorbing phosphonates in the concentrate-sludge mixture onto the first or second sludge;
subjecting the concentrate-sludge mixture to a flocculation process to form a floc-mixture; and
directing the floc-mixture to a second settling zone and separating treated water from the floc-mixture.

15. The method of claim 14 including separating the floc-mixture in the second settling zone into treated water and the second sludge.

16. The method of claim 14 including adding phosphonates to the water upstream from the membrane filtration zone and wherein the phosphonates generally prevent precipitation of salts onto one or more membranes in the membrane filtration zone.

17. The method of claim 14 including:
mixing both a coagulate and a flocculent with the concentrate-sludge mixture wherein the coagulate comprises iron or aluminum and wherein the sludge mixed with the concentrate contains hydroxide;
forming iron hydroxide or aluminum hydroxide in the concentrate-sludge mixture by adding the coagulate to the sludge; and
wherein at least some of the phosphonates are adsorbed onto the iron hydroxide or aluminum hydroxide.

18. A method of removing phosphonates from water comprising:
directing the water into a first settling zone and producing a first portion of sludge in the first settling zone;
directing the water from the first settling zone to a membrane filtration zone and filtering the water in the membrane filtration zone to produce a concentrate containing phosphonates;
contacting the concentrate containing phosphonates with the first portion of sludge such that at least some of the phosphonates in the concentrate are adsorbed onto the first portion of the sludge;
adding a flocculant to the sludge and the concentrate to form a floc-mixture;
directing the floc-mixture to a second settling zone to form treated concentrate; and
producing a second portion of sludge in the second settling zone and wherein the concentrate is contacted with the second portion of sludge such that at least some of the phosphonates in the concentrate are adsorbed onto the second portion sludge.

19. The method of claim 18 further comprising mixing the concentrate with the second portion of sludge for approximately 10 minutes.

20. A method of removing phosphonates from water comprising:
directing the water into a first settling zone;
directing the water from the first settling zone to a membrane filtration zone and filtering the water in the membrane filtration zone to produce a concentrate containing phosphonates;
contacting the concentrate containing phosphonates with sludge such that at least some of the phosphonates in the concentrate are adsorbed onto the sludge;
adding a flocculant to the sludge and the concentrate to form a floc-mixture; and
directing the floc-mixture to a second settling zone to form treated concentrate, and
mixing the flocculate with the sludge and concentrate at a relatively fast speed and then at a subsequent relatively slow speed.

21. The method of claim 20 wherein the relatively fast speed is approximately 250 rpms and the relatively slow speed is approximately 60 rpms.

* * * * *